United States Patent [19]

Perrella et al.

[11] 3,742,617

[45] *July 3, 1973

[54] TESTING MACHINE

[75] Inventors: Guido Perrella, Montreal, Quebec; Robert Genest, Outremont, Quebec, both of Canada

[73] Assignee: Testograph Limited, Lachine, Quebec, Canada

[ * ] Notice: The portion of the term of this patent subsequent to Mar. 28, 1989, has been disclaimed.

[22] Filed: Dec. 16, 1970

[21] Appl. No.: 98,630

[30] Foreign Application Priority Data
May 21, 1970 Canada .............................. 083,305

[52] U.S. Cl. ........................... 35/22 R, 35/35, 35/48
[51] Int. Cl. .............................................. G09b 19/00
[58] Field of Search ................... 35/9, 22, 35 B, 48

[56] References Cited
UNITED STATES PATENTS
2,915,833  12/1959  Genest .................................. 35/22
3,482,332  12/1967  Hvale et al. ......................... 35/35 B
3,020,653  2/1962  Joslow ................................. 35/35 B

Primary Examiner—Robert W. Michell
Assistant Examiner—J. H. Wolff
Attorney—Cushman, Darby & Cushman

[57] ABSTRACT

A device for the application and recording of written tests such as word or idea association; question and answer; evocative or suggestive tests; aptitude etc. Pre-printed tests on paper rolls are inserted into the machine and the tests sequentially appear in a slot or window which remains open for a predetermined length of time during which an answer may be written on the test paper. A timer control adjusts the timing for the slot opening and closing. A control button allows an examinee to move on to the next question should he be able to reply in less than the alloted time and the length of time taken to reply is automatically recorded on the test paper. An attachment is available for ink blot or other visual tests.

5 Claims, 10 Drawing Figures

TESTING MACHINE

This invention relates to apparatus for the application and recording of any written tests such as word or idea association; question and answer; aptitude, etc.

The need for examination, investigation and analysis of the human personality from all points of view is increasing every day. A large number of excellent tests allow the human behaviour to be explored and estimated but time has always been the handicap to the development of the psychological sciences and the evaluation of tests.

U.S. Pat. No. 2,715,784 of Aug. 24, 1955 and U.S. Pat. No. 2,915,833 of Dec. 8, 1959 provided advances in the field of testing machines and they included structures that possessed prepared questions and paper for written answers thereto, a window revealing the question on the paper and a shutter or blind for closing the window. However, these devices had several shortcomings such as continually moving the paper, no means of automatically timing the examinee, slowly moving shutters and others. These faults resulted in an inability to precisely time the examinee during the answering period.

Many valuable hours are lost by a test examiner awaiting sometimes inaccurate answers. Group testing does not give the individual and personal value of a strict interpretation of results and the re-writing of a test is a non-recoverable loss of time for the examiner. Moreover a good evaluation of the human personality with a valuable interpretation and orientation often requires several different areas of investigation.

In a co-pending application Ser. No. 048,322 filed on Apr. 10, 1969, now U.S. Pat. No. 3,660,674 important improvements in this art were disclosed. One basic feature was the provision of a test taking device which would indicate the ability of an examinee in answering one or a series of questions with a preselected time for each question. The apparatus was automatic in simultaneous and sequential operations but in another aspect the examinee had overriding manual control under certain circumstances, especially with respect to the answering period. The present application discloses a similar machine but with further improvements especially in a marked reduction of parts and their function.

According to a broad aspect of the present invention, apparatus for the application and recording of written tests comprises a sealable casing with a closeable window therein, a shutter for opening and closing the window, a supply of paper in the casing and having preprinted tests thereon for answering through the window by an examinee, a time control mechanism for preselecting the length of time that the shutter will stay open, a control button for closing the shutter prior to the expiration of the preselected time period, means for recording the time taken by an examinee to answer a question on the paper, means for automatically closing the shutter at the termination of the preselected time period, and a source of energy in the apparatus for operating the same.

The invention will be more readily understood with reference to the accompanying drawings when an embodiment of the invention is illustrated by way of example in which.

GENERAL DESCRIPTION

Figure 1:
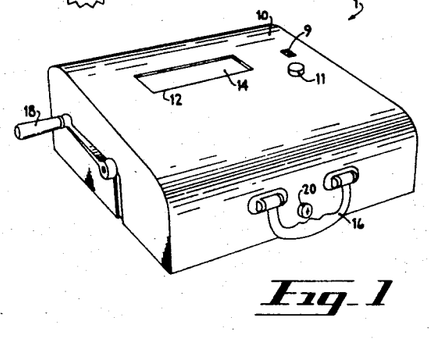
FIG. 1 is a perspective view of the testing machine.

Referring to FIG. 1, the apparatus generally indicated at 1 includes a casing having a cover member 10, the cover 10 including a window or slot 12 being open or closed by means of a movable shutter 14. The cover 10 includes a carrying handle 16 and an actuating crank 18 for operating the apparatus in a manner to subsequently be described. The cover also includes a lock 20 whereby the apparatus can be sealed or opened by an examiner.

Figure 2:
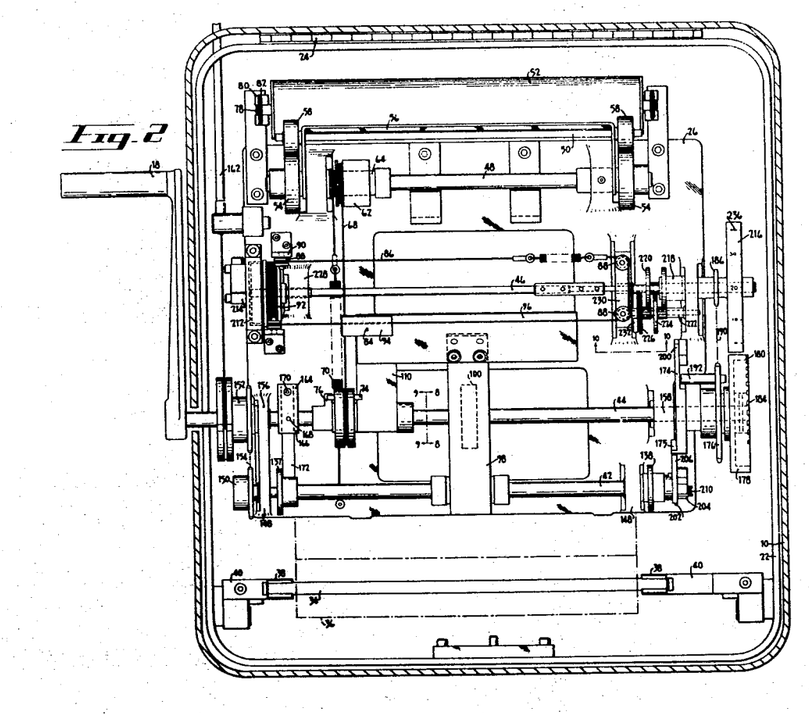
FIG. 2 is a plan view of the machine with the cover of the casing removed to reveal the working parts thereof.

Looking now at FIG. 2, the cover 10 is hinged to a lower casing 22 by means of a continuous piano type hinge 24 and the lower casing 22 supports a base 26 formed of cast metal or the like, the base 26 having leg portions 28 (FIG. 3) secured to the lower casing 22 by recessed bumpers or feet 30 of resilient material and cap screws 32 for passing therethrough.

A series of parallel shafts are provided within the casing and on the base and reading from the bottom to the top of FIG. 2, these include a paper supply shaft 34 adapted to freely support a roll of paper 36 thereon, the ends of the shaft being held in clips 38 provided on shaft support brackets 40 secured to the lower casing 22.

On the base 26, there is provided a shutter shaft 42, a crank shaft 44, a drive shaft 46, a paper drive shaft 48 with a secondary paper drive shaft 50 secured thereto and a paper take-up drum 52. Means for recording the elapsed time of the test is indicated generally at 94 this time recording means generally overlying the drive shaft 46.

GENERAL DESCRIPTION OF OPERATION

A supply of paper 36 is placed on the paper support shaft 34, this paper having printed thereon a sequential series of questions with a space adjacent the question for the examinee to apply written their written answer. Additionally, each section of the paper having a question and an answering space includes time scale of any preferred duration but for example a period from 0 to 120 seconds. The paper is fed from the supply shaft 34 along a path shown in FIG. 3 which takes it over a paper track or platen 35 which is disposed beneath the movabe shutter and onto the paper take-up drum 52. The examinee rotates the shaft 44 by means of the actuator or crank 18 shown in FIG. 1, this action opening the shutter 14 while simultaneously rotating the drive shaft 46 to load a motor means to be described hereafter; the time for the test is preset by the examiner and if the examinee should finish his answer prior to the expiration of the set time, he presses a button 11 shown in FIG. 1 which effects closing of the shutter 14 over the answered question and at the same time marks the expired time for the test on the paper 36 by means of the recording mechanism 94. The examinee is then free to proceed to the next question. On the other hand, if the examinee should fail to answer the question during the given length of time for the test, at the expiration of that time the shutter will automatically close and the expired time will again be marked by the recording means 94. When the crank handle 18 is again rotated, the paper will be forwarded onto the drum 52 so that the next question appears in the window 12 when the shutter 14 opens.

Paper Storage and Advance

Figure 3:
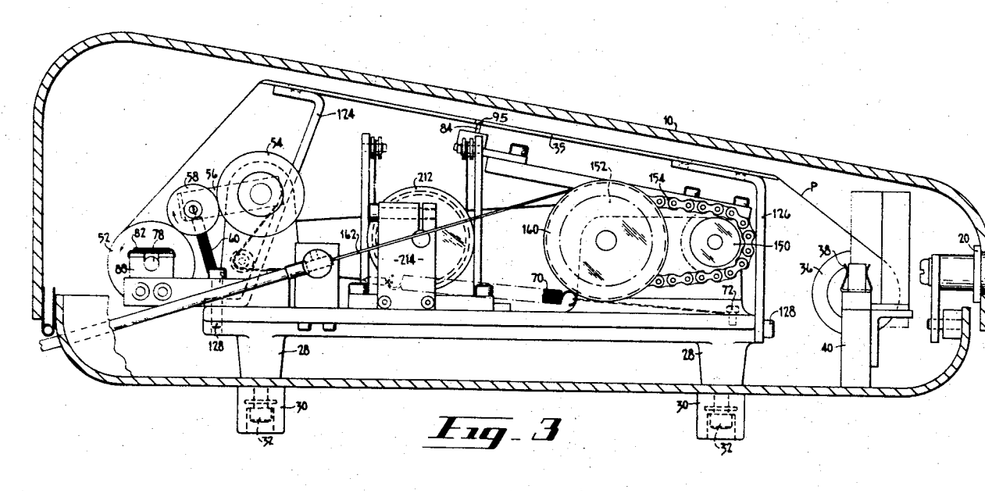
FIG. 3 is a side elevation of the apparatus looking at the left side of FIG. 2.

Referring to FIGS. 2 and 3 the paper shaft 48 is provided with a pair of primary rollers 54 and the secondary shaft which is supported on a bracket 56 is provided with a pair of secondary rollers 58. As shown in FIG. 3, contact is maintained between the primary and second rollers 54 and 58 and between the secondary roller and the surface of the paper on the drum 52 by means of a coil spring 60. The shaft 48 also includes a paper advance pulley 62 which, when rotated, allows one-way movement only of the shaft 48 through provision of a clutch 64.

Crank shaft 44 includes a pulley 66 to which is secured one end of a cable 68 having its other end trained around the pulley 62 on the paper shaft 48 and terminating at a coil spring 70, held to a cap screw 72 on the base 26 as shown in FIG. 3. The pulley 66 on the drive shaft 44 has a dowel pin 74 which is engageable by a pawl 76 secured to the drive shaft 44.

It will be appreciated from FIGS. 2 and 3 that rotation of the crank shaft 44 will effect rotation of the pawl 76 engaging the pin 74 thereby rotating the drive pulley 66 and the paper advance pulley 62 by means of cable 68. Additionally, rotation is also imparted to the primary rollers 54 and thereby to the secondary rollers 58 and finally to the paper on the surface of the drum 52. This effects rotation of the paper and draws it from the paper roll 36 on the supply shaft 34. It will be understood that the amount of advance of the paper is equal to the spacing thereof of sequential questions with their answer spaces.

As shown in FIGS. 2 and 3, the paper take-up roll 52 has protruding axle pins 78 held in slots of bearing blocks 80 by means of retaining springs 82. In order to remove the drum 52, the springs 82 are moved aside and the drum 52 can be removed with the answered or unanswered questions thereon.

Elapsed Time Recording Mechanism

As shown in FIG. 2, the recording mechanism 94 includes a pin punch 84 secured to a cable 86 which is trained about 4 idler pulleys 88 provided on supports 90. Additionally, cable 86 is trained about a drive pulley 92 mounted on the drive shaft 46. It will be appreciated that rotation of the drive pulley 92 will effect travel of the cable 86 about the idler pulleys 88 and will also effect reciprocal travel of the pin punch 84 across the paper through provision of a slot 95 in the shutter platen 35 as shown in FIG. 3. The pin punch 84 therefore travels left to right of FIG. 2 and when actuated, will mark a pinhole in a time scale provided on the answer portion of the paper.

Figure 8:
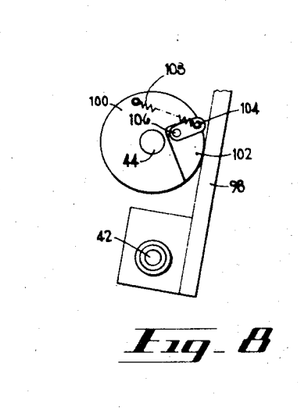
FIG. 8 is a partial sectional view taken along the lines 8—8 of FIG. 2.

A punch actuating member 96 is T-shaped in formation and has a lifter plate underlying the pin punch 84 and it extends the width of the recorded portion of the paper. The lifter 96 is secured by screws to a bar 98 that is freely and rotatably mounted to the shutter shaft 42. Bar 98, as shown in FIG. 8, overlies a cam wheel 100 mounted on the crank shaft 44. Wheel 100 has a recessed portion 102 which accommodates a trip bar 104 pivoted at one end on the dowel pin 106 and retained against one side of the recess by a spring 108.

When the examinee has completed his question before the expiration of the given time or if the examinee fails to answer the question and the shutter closes, actuation of the crank 18 and rotation of the crank shaft 44 to open the shutter for the next question will, before the paper is advanced, effect rotation of the cam wheel 100 and the trip 104 will raise the bar 98 and lifter 96 which in turn will raise the pin punch 84 so that it will extend through the slot 94 as shown in FIG. 3 to punch a hole in the time scale of the paper.

Figure 9:
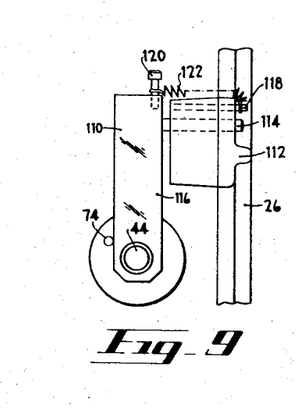
FIG. 9 is a partial cross-sectional view taken along the lines 9—9 of FIG. 2.

FIGS. 2 and 9 illustrate means for adjusting the stroke of the paper drive pulleys 62, 66 and the paper shaft 48 which comprises an adjusting arm 110 which is freely and rotatably mounted on the crank shaft 44 and is positioned adjacent to the pulley 66 so that the dowel pin 74 therein rests against the upper surface of the adjusting arm 110. Base 26 is provided with a block 112 having a set screw 114 therein which passes through the block and engages the underside 116 of the adjusting arm 110. A dowel pin 118 in the lower part of the block 112 together with a set screw 120 in the terminal end of the arm 110 each serve to retain a coil spring 122 which maintains the arm 110 onto the set screw 114.

It will be understood from FIG. 9 that adjustment of the set screw 114 will either raise or lower the arm 110 and reduce or increase the circumferential travel of the pulley 66 by engaging the dowel pin 74 at various points in its circumferential travel. Obviously, lowering the arm 110 will increase the circumferential travel of the pin 74 and pulley 66 and thereby increase the stroke of the paper advance.

Shutter Drive Mechanism

The shutter 14 as shown in FIG. 1 is normally closed and is opened by rotation of the shutter shaft 42 and will stay open until the expiration of the preset time period or by actuation of a button by the examinee if he should answer the question prior to the expiration of time. The shutter structure itself is not illustrated in FIG. 2 for purposes of clarity but FIG. 2 does illustrate the shutter shaft 42 and its relation to the crank shaft 44. The shutter is illustrated in FIGS. 3 to 7 inclusive.

Figure 5:
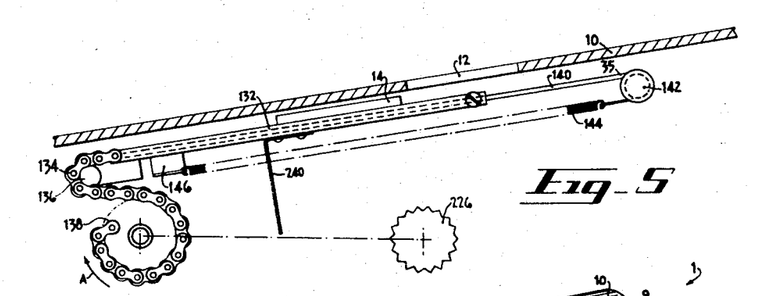
FIG. 5 is a partial cross-sectional view showing the shutter mechanism.
Figure 6:
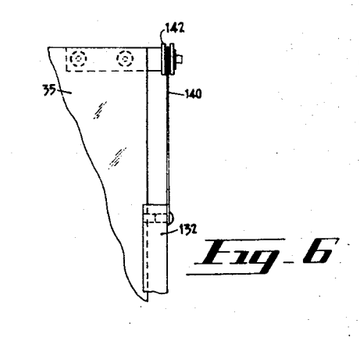
FIG. 6 is a partial cut-away view of a portion of the shutter shown in FIG. 5.
Figure 7:
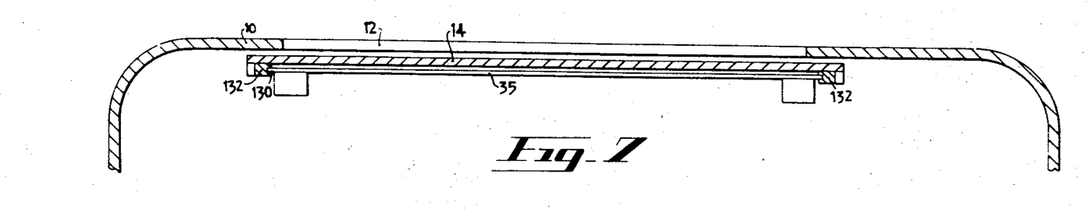
FIG. 7 is a sectional view through the cover of the apparatus showing the shutter in longitudinal cross-section.

Referring first to FIG. 3, the shutter includes the paper track 35 which is supported so that its surface is parallel to the underside of the cover 10 by means of fore and aft support legs 124, 126 which are secured at their lower ends to the base 26 by suitable screws 128. The terminal side edges 130 of the platen 135 serve as guides for the shutter 14, the latter extending beyond the width of the window or slot 12 as shown in FIG. 7. Referring to FIG. 5 the shutter 14 has a pair of guide tracks 132 secured to its lower surface at either side thereof. It will be noted from FIG. 7 that the tracks 132 receive the guides 130 therein. One end of each guide track 132 is detachably connected to a roller chain 134 which is trained about a chain wheel 136 secured to the lower surface of the paper support 35 as shown in FIG. 5. The other end of each chain 134 is detachably connected to a corresponding chain wheel 137 and 138 mounted on the shutter shaft 42 as shown in FIG. 2. The other ends of the guide tracks 132 are connected to a cable 140 trained around idler pulleys 142 provided on the underside of the paper support 35. The other end of the cable 140 is detachably connected to one end of coil spring 144 of suitable strength which in turn is secured to the underside of the paper support 35 by means of a bracket 146.

Turning now to FIG. 2, the shutter shaft 42 is mounted for rotation in bearings 148 and one end of the shaft (the left end viewed in FIG. 2) is provided with a sprocket 150 which is interconnected to a sprocket 152 on crank shaft 44 by roller chain 154 as shown in FIG. 3.

It will be understood from FIGS. 2 and 5 that rotation of the crank shaft 44 and therefore the shutter shaft 42 will cause rotation of the chain wheels 138 in the direction of arrow A in FIG. 5 whereby the chain 134 will draw the guide tracks 132 and the shutter 14 along the guides 130 so that the shutter 14 will open the window 12 as shown in FIG. 5. At the expiration of the time period, the shutter shaft 42 will be released in a manner subsequently to be described and the coil spring 144 shown in FIG. 5 will draw the shutter 14 to its closed position.

Crank Shaft and Associated Mechanism

The function of the crank shaft 44 is to load the timing mechanism associated with the motor shaft 46; to effect the paper advance as previously described with reference to the pulleys 62 and 66 and also to effect marking of the paper with the time of the previous question as already described with reference to the pin punch 84 and its associated mechanism.

Crank shaft 44 has on its extreme left end shown in FIG. 2 a removable crank or actuator 18 and the shaft is journalled in bearings 156 and 158 of the base member 26. Immediately within the casing 22, the shaft 44 is provided with a pulley 160 used for actuating auxiliary equipment such as an ink blot testing machine through a connecting cable 162.

Adjacent the bearing 156, there is provided a stroke limiter 164 which consists of a block 166 secured to the shaft 44 by a dowel pin 168 and being provided at its outer end with a set screw 170. The base 26 is provided with a spring member 172 which is adapted to be contacted by the set screw 170 when the shaft 44 is rotated approximately 180°. The adjustment of the stroke can be made on the set screw 170.

Figure 4:
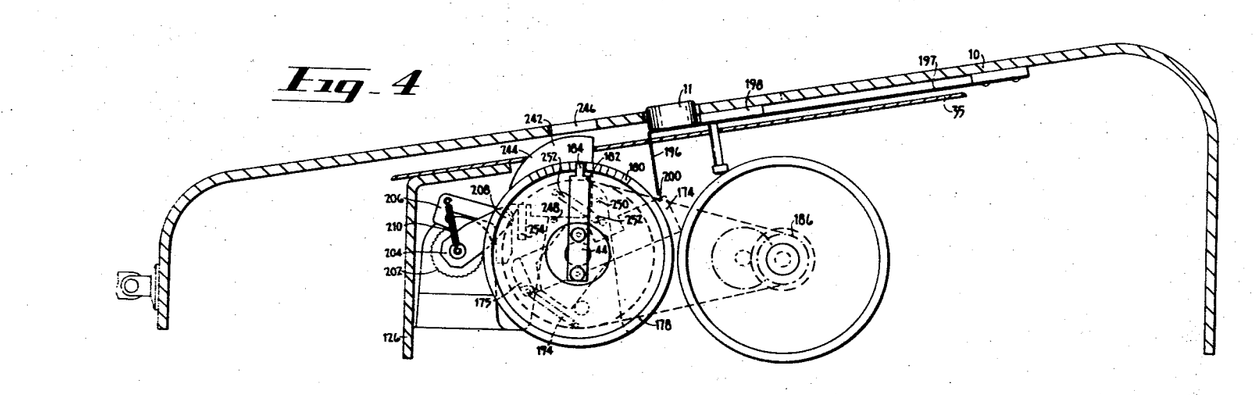
FIG. 4 is a side elevation of the apparatus looking at the right side of FIG. 2.

Referring now to the right hand side of the shaft 44 in FIG. 2 and to the elevational view of that side as shown in FIG. 4. Beyond the bearing 158, shaft 44 carries a trigger member 174, sprocket 176 and a freely rotatable time setting wheel 178 which would have the time indicia marked on the surface thereof adjacent each of a plurality of notches 180. As shown in FIG. 4, a time setting indicator 182 is provided on the extreme outer end of crank shaft 44 and the indicator 182 can be pulled outwardly so that its upper tip 184 which normally engages one of the notches 180 in the wheel 178 can be disengaged therefrom so that the wheel 178 can be moved under the indicator 182 to the desired time.

The sprocket 176 is interconnected to a sprocket 186 on the motor shaft 46 through roller chain 190. Sprocket 176 also includes a pin 192 projecting from one side thereof, this pin being adapted to engage a recessed portion of the trigger 174 as shown in FIG. 2 for actuating the same. As shown in FIG. 4, the trigger 174 is maintained in the illustrated position of that Figure by a coil spring 194 connected to the trigger end. As previously mentioned, the shutter 14 is closed either automatically at the end of the time period or is closed manually by the examinee if he finishes the question prior to the time expiration. The closing in either instance is effected by the trigger 174 under the influence of the sprocket pin 192 (automatic) or by the button 11 (manual) and by an extension rod 196 thereof shown in FIG. 5. As shown in FIG. 4, the button 11 protrudes through an aperture in the cover 10 and is secured to a spring 197 that is fastened at one end to the underside of the cover 10 and which is bent at the other end to form the rod 196. The spring 197 maintains the button 11 in the position illustrated in FIG. 4 and specifically against the pad or rest 198 of resilient material secured to the underside of the cover 10 as shown. The terminal end of the rod 196 is adapted to engage slot 200 in the trigger 174 when the button 11 is depressed by the examinee.

The terminal ends of the shutter shaft 42 is provided with a ratchet wheel 202, a ratchet arm rotatably secured to the hub of the ratchet 202, the arm 204 carrying a ratchet pawl 206 which is pivoted to the arm 204 at 208. A coil spring 210 maintains the pawl 206 in engagement with the teeth of the ratchet wheel 202.

It will be understood from FIG. 2 that rotation of the crank 18 and the crank shaft 44 also effects rotation of the motor shaft 46 through sprockets 176, 186 and chain 190 and also effects rotation of the shutter shaft 42 through the sprockets 150, 152 and chain 154. When the shutter shaft 42 is rotated in this manner, the shutter 14 is drawn to the open position as previously described and the ratchet pawl 206 by engaging the teeth of the ratchet 202, prevents reverse rotation of the shutter shaft 42 and therefore also prevents rotation of its associated chain wheels 137, 138 and movement of the mechanism shown in FIG. 5.

It will be subsequently described that as the motor shaft 46 runs out with the expiration of the alloted time period, it will rotate the sprocket 176 on crank shaft 144 and its associated pin 192 which will engage the trigger 174 so that its other terminal end 175 will be swung upwardly to strike the free end of the pawl 206 thereby swinging the latter about its pivot point 208 so that the pawl 206 is released from the teeth of the ratchet 202. The springs 144 (FIG. 5) then draw the shutter 14 closed and in so doing draw the chains 134 and the wheels 137, 138 to their previous position. Similar action takes place if the examinee should finish the question before expiration of the time period and depresses the button 11 as shown in FIG. 4. The rod 196 by engaging slot 200 in trigger 174 will also effect pivoting of the latter to disengage the pawl 206 from the ratchet 202.

Motor Shaft and Associated Mechanism

Figure 10:
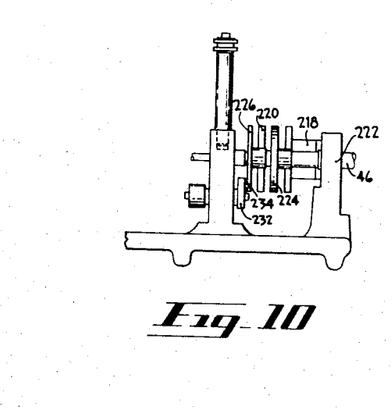
FIG. 10 is a partial sectional view taken along the line 10—10 of FIG. 2.

The motor shaft 46 transmits power to operate the apparatus after the shutter had been opened by rotation of the crank 18. This power is retained in a spring motor 212 mounted on the base 29 by a support 214 shown in FIG. 3. The left terminal end of shaft 46 is connected to that spring while the right end of the shaft 46 supports a time indicator wheel 216 through a clutch 218 as shown. Gear 220 serves to operate an idler shaft 222 (shown in more detail in FIG. 10). This shaft carrying the gear 224 and clock wheel 226. Note also FIG. 5. As shown in FIG. 2, the motor shaft 46 is mounted in bearings 228 and 230, the latter also supporting an escapement mechanism 232 which utilizes a pair of pins 234 operating in a pendulum fashion on the teeth of the clock wheel 226.

As shown in FIG. 2 the time indicator wheel 216 has indicia 236 marked on the surface thereof which will be indicated to the testee through a window 9 in the cover as shown in FIG. 1.

FIG. 2 illustrates that the spring motor 212 is wound by rotation of the handle 18, crank shaft 44, sprockets 176–186 and rotation of motor shaft 46. As shown in FIG. 5, a time stopper in the form of a brake rod 240 is secured to the lower surface of one of the shutter guides 132 and the lower end of the brake 240 is adapted to engage the teeth of the clock wheel 226. As the crank 18 is rotated and the shutter is drawn open, the brake 240 is pulley away from the surface of clock wheel 226, the motor 212 is wound and the alloted time set on the wheel 178 begins to be paid out by the pendulum apparatus of the escapement 232.

Method of Operation

The examiner unlocks the cover 10 and presets the time for the question and answers printed on the paper 36. This is accomplished by axially withdrawing the time setting indicator 184 and rotating the wheel 178 until the desired time, say 60 seconds, is turned up and the indicator 184 is returned axially so that it engages the 60 second notch. It will be appreciated that rotation of the wheel 178 also rotates the sprocket 176 and its pin 192 and further rotates the sprocket 186 and the time indicator wheel 216 so that the 60 second limit will appear in the window 9. With the apparatus in the FIG. 2 position, the cover is closed and locked by the lock 20.

When told to proceed, the examinee rotates handle 18 which effects opening of the shutter via the chain wheels 137, 138; advances the paper by rotation of the pulleys 62, 66 through cable 68; and winds the spring motor 212 through rotation of the motor shaft 46. It should be noted from FIG. 2 that when moving the wheel 178 to set the tests time, the sprocket 176 and sprocket 192 are moved counterclockwise in FIG. 4 so that the pin 192 is moved away from the trigger 174. That is, the shorter the time for the tests, the closer the pin 192 will be to the trigger 174. Conversely if the time is set for 120 seconds then the pin 192 will be a substantially circumferential extent from the trigger 174.

As the shutter 14 is opened, the examinee views the question and begins to prepare his answer in the provided space. If he finishes the question to his satisfaction before the expiration of the 60 second time, he presses the button 11 so that its extension 196 trips the trigger 174 thereby releasing the shutter via the pawl 206 and ratchet wheel 202 so that the shutter 14 closes. Simultaneously, the brake 240 on the lower part of the shutter (FIG. 5) engages the excapement clock wheel to prevent further rotation of the shaft 46 by the spring motor 12.

If the 60 second alloted test time should run out prior to the completion of the question by the examinee, it will do so by rotation of the shaft 46 via the escapement mechanism 232 which allows rotation also of the time indicator wheel 216 and the sprockets 186, 176 and chain 190. As sprocket 176 is rotated and the time limit is reached, the pin 192 is brought around to the point where it contacts the trigger 174 to release the shutter to its closed position.

The examinee then moves on to the next question whether he has manually closed the shutter or whether it has been done automatically. As he rotates the handle 18 for the second question, a brake 240 (FIG. 5) is pulled away from the clock wheel 226 and rotation of the crank shaft 44 also turns the cam wheel 100 (FIG. 8) to effect marking of the paper by the cam 104 operating the lever 98 and the pin punch 84.

Means are also provided for indicating to the Examiner an attempt of cheating the device by the Examinee. Referring to FIG. 4, a cheat indicator 242 has a curved, color-coded edge 244 adapted to appear in a window 246 of the cover 10. Indicator 242 is biased against pin stops 248, 250 by a spring 252 and includes a depending pin 254.

If the time runs out on the examinee and he manually holds open the shutter 14 against spring 144, the brake 240 will be unable to engage the clock gear 226 to stop the motor shaft 46. As a result, pin 192 on sprocket 176 will carry the trigger 174 a greater circumferential distance so that its end 175 will engage pin 254 to pivot the indicator 242 to a "cheat" position where the coded surface will show through the window 246.

Although the embodiment described utilizes a spring for operative power, it is within the scope of the invention to effect such operation by electrical means either from wall outlets or from battery power.

The embodiments of the invention in which an exclusive property or privilege is claimed are defined as follows:

1. Apparatus for the application and recording of written tests comprising a base structure with a lockable cover thereon, a window in said casing to reveal an examination question therein and a shutter assembly for opening or closing said window; said base structure supporting
   a. a plurality of shafts mounted in spaced parallel relationship and including i) a paper supply shaft adjacent one end of said base structure for supporting a supply of paper having printed questions thereon ii) a shutter drive shaft for actuating said shutter assembly iii) a paper drive shaft and a paper storage assembly remote from and parallel to the paper supply and adjacent the other end of the base for drawing said paper beneath said window and storing the same; iv) a motor shaft and motor means thereon for closing said shutter; and v) a crank shaft having means interconnecting the same with the shutter shaft, motor shaft and paper drive shaft;
   b. a time control mechanism for preselecting the time that the shutter stays open and being operated by said motor means;
   c. control means for closing the shutter prior to the expiration of the preselected time period;

d. elapsed time recording means associated with said motor shaft and shutter shaft for marking directly onto said paper transverse to its line of travel;

e. said paper drive shaft and storage assembly comprising a paper take-up and storage drum adjacent and spaced from said paper drive shaft, a pair of primary rollers mounted on the paper drive shaft for rotation therewith; and a pair of secondary rollers in surface contact with the primary rollers and the storage drum whereby rotation of said crank shaft and the paper drive shaft is transmitted to the storage drum to draw said paper from the supply roll and beneath said window.

2. The apparatus according to claim 1 wherein said elapsed time recording means comprises:

a. a plurality of idler pulleys spaced adjacent said motor shaft;

b. a drive pulley on said motor shaft;

c. a cable trained about said drive and idle pulleys;

d. a pin punch carried on said cable for reciprocation thereby transverse to the path of travel of the paper, and e. means underlying said pin punch for moving the latter upwardly whereby the pin will mark said paper comprising a bar member having a head portion underlying said punch throughout its path of travel, said bar having a leg portion pivotally mounted on said shutter shaft, and a cam wheel on said crankshaft and supporting said leg portion whereby rotation of said crankshaft and cam wheel effect raising of the pin punch to mark said paper.

3. Apparatus according to claim 1 wherein said shutter is normally closed and the shutter assembly includes a paper support extending beneath said window and spaced from the underside of the casing; guide tracks mounted along the sides of said support and mounting the shutter therebetween; spring means urging said guides and shutter to a closed position; a sprocket on either end of said shutter shaft and means interconnecting said guides and shutter to said sprockets so that, upon rotation of said crankshaft, the shutter shaft and sprockets are rotated to draw said shutter open.

4. The apparatus according to claim 3 including means to keep said shutter open, comprising a ratchet wheel on the end of said shutter shaft, a ratchet arm and pawl pivotally mounted thereon and spring means maintaining the pawl in engagement with the ratchet wheel, thereby preventing reverse rotation of the shutter shaft.

5. Apparatus according to claim 4 including motor means for closing the shutter comprises:

a. a trigger member for releasing said pawl whereby said shutter shaft will reverse rotate to close said shutter;

b. an actuating pin for said trigger and operated by rotation of said motor shaft for automatically triggering said pawl;

c. a central button for manually actuating the trigger by an examinee prior to the expiration of the time period;

d. a spring motor on said motor shaft for rotating the same;

e. an escapement mechanism for controlling rotation of the motor shaft under influence of the spring motor; and f. a time indicator mounted on the end of said motor shaft.

* * * * *